US005853836A

United States Patent [19]

Zoss

[11] Patent Number: 5,853,836

[45] Date of Patent: Dec. 29, 1998

[54] LABEL FOR A ROLLED FOOD ITEM

[75] Inventor: Robert A. Zoss, Plymouth, Minn.

[73] Assignee: General Mills, Inc., Minneapolis, Minn.

[21] Appl. No.: 888,803

[22] Filed: Jul. 7, 1997

[51] Int. Cl.[6] .......... A23L 1/00

[52] U.S. Cl. .......... 428/40.1; 40/312; 40/638; 426/106; 426/127; 426/410; 428/41.9; 428/42.1; 428/906

[58] Field of Search .......... 428/40.1, 41.9, 428/42.1, 906, 192, 194; 40/638, 312; 426/127, 410, 106

[56] References Cited

U.S. PATENT DOCUMENTS

| | | | |
|---|---|---|---|
| 3,205,972 | 9/1965 | Stricker | 428/906 |
| 4,770,913 | 9/1988 | Yamamoto | 428/41.9 |
| 4,889,234 | 12/1989 | Sorensen | 428/41.9 |
| 5,051,259 | 9/1991 | Olsen | 428/906 |

FOREIGN PATENT DOCUMENTS

| | | | |
|---|---|---|---|
| 2050035 | 3/1971 | France | 428/41.9 |

*Primary Examiner*—Nasser Ahmad

*Attorney, Agent, or Firm*—John A. O'Toole; L. MeRoy Lillehaugen; Alan D. Kamrath

[57] ABSTRACT

A rolled food item (110) is formed by rolling a strip of food (14) supported on support material (16) around the cut leading edge into a roll having multiple rotations with the strip of support material (16) located on the outside of the roll. A label (68) is attached to the support material (16) and extends over the trailing edge of the support material (16). Adhesive (120) is applied as a solid layer over the entire inside surface (112) of the label (68). Masking (122, 124, 130) is applied over the adhesive (120) which interferes with the adhesive properties of the adhesive (120). Thus, the label inner surface (112) includes a first zone adjacent to the leading end (116) for adhering to the strip of support material (16) and not covered with masking (122, 124, 130) and a second zone adjacent to the trailing end (118) for adhering to the strip of support material (16) if the length of the label (68) is less than the periphery of the roll or for adhering to the label outer surface (114) if the length of the label (68) is greater than the periphery of the roll, with the second zone also not covered by masking (122, 124, 130). The second zone adheres to a portion (134) of the label outer surface (114) which is free of a glossy top coating. The third zone is located intermediate the first and second zones and is defined by the masking (122, 124, 130).

19 Claims, 2 Drawing Sheets

LABEL FOR A ROLLED FOOD ITEM

BACKGROUND

The present invention generally relates to food items, particularly to rolled food items, more particularly to coils of food supported on support material, and specifically to labels for rolled food items or the like.

The sale of snack-type food products is a highly competitive business. In addition to the particular food components, increasingly the novelty and play value of the product are important in the marketability of any particular food item. For example, fruit-based snack products such as FRUIT ROLL-UPS™ fruit products have found wide market acceptance. Likewise, U.S. Pat. No. 4,882,175 recognized the enhanced marketability of chewing gum in the form of a rolled-up tape allowing the consumer the chance to break off the desired size of piece to chew, saving the rest for later.

Many foods such as dehydrated fruit puree do not lend themselves to forming rolled food items such as where the food is in a strip of a thinness generally requiring external support and/or where the food tends to stick to itself such that it creates a single mass which can not be unrolled. In such cases, support material and food supported thereon are rolled into a coil creating a novelty form of merchandising for that food. For example, FRUIT BY THE FOOT™ fruit products of the type disclosed in U.S. Pat. Nos. 5,455,053 and 5,723,163 have enhanced play value which is believed to promote the marketability thereof.

During the fabrication of rolled food items, provisions have to be made to prevent the food item from unrolling during fabrication such as in the wrapping and other packaging operations. One method is to utilize an edible adhesive such as corn syrup. However, corn syrup and similar adhesives have certain negatives including being messy while eating and also during application and fabrication and being generally difficult to work with. A preferred method to prevent undesired unrolling is the application of a label extending over the trailing edge of the support material.

In addition to its functional aspects, the labels used to hold the rolled food items in a coiled condition can add to the novelty and play value of the rolled food item. Particularly, the label often includes graphics which are visually appealing to the typical consumer of the food of the rolled food item and/or which promote the future purchase of the rolled food item. Thus, the label itself apart from the rolled food item may have play value, especially when the consumers of the rolled food items are children. Particularly, children frequently remove the label from the rolled food item and place it on other surfaces.

The food is removed from the support material when it is desired to consume the food. Thus, especially when the support material is rolled with the food into the coil, the support material is formed or coated in a manner to enhance the ability to easily separate the food from the support material for consumption. It can then be appreciated that the attributes which allow food to be easily separated from the support material also make it difficult to adhere labels to the support material. Thus, it is necessary to utilize very aggressive adhesive on the labels to insure that the label adheres to the support material and maintains the rolled food item in a coiled condition. However, due to the aggressiveness of the adhesive of the labels, the labels even after removal from the rolled food item will stick to other surfaces in a manner to make their removal difficult. Many times, a putty knife was required to scrape off prior labels which takes time and can easily damage the surface to which the label was stuck. This problem was so severe that schools were considering prohibiting children from bringing rolled food items including such labels into school because of the difficulty in removing labels that had not been appropriately discarded.

Prior attempts were made to overcome this problem by reducing the aggressiveness of the adhesive applied to the label. However, such attempts failed. Specifically, reducing the aggressiveness of the adhesive allowed the labels to be more easily removed when inadvertently or inappropriately affixed to articles but also resulted in the labels being unable to be applied in existing fabrication equipment without significant change to its operating conditions or were otherwise ineffective in maintaining the rolled food item in a coiled condition during transport or wrapping operations during their fabrication.

Accordingly, it is an object of the present invention to provide novel labels for rolled food items, which in the preferred form are able to adhere to support material from which the food can be easily separated but which can be easily separated from other surfaces after their removal from the rolled food item and especially rolled food items formed by food coiled with a strip of support material.

Another object of the invention is to provide such novel labels which are able to be applied to rolled food items in existing fabrication equipment without significant change to its operating conditions.

SUMMARY

Suprisingly, the above objectives and other problems can be satisfied in the field of labels for rolled items by providing in the preferred form, first and second adhesive zones located on the label inner surface adjacent to the leading and trailing ends and a third adhesive zone located on the label inner surface intermediate the first and second zones and having lesser adhesive properties than the first and second zones, with the first zone adhering the label inner surface to the rolled material and the label inner surface extending over the trailing edge of the rolled material on the periphery of the roll.

In yet other aspects of the present invention, adhesive is applied as a solid layer over the entire label inner surface and the third zone is formed by applying at least a first masking over the adhesive which interferes with the adhesive properties of the adhesive while the first and second zones are free of masking.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
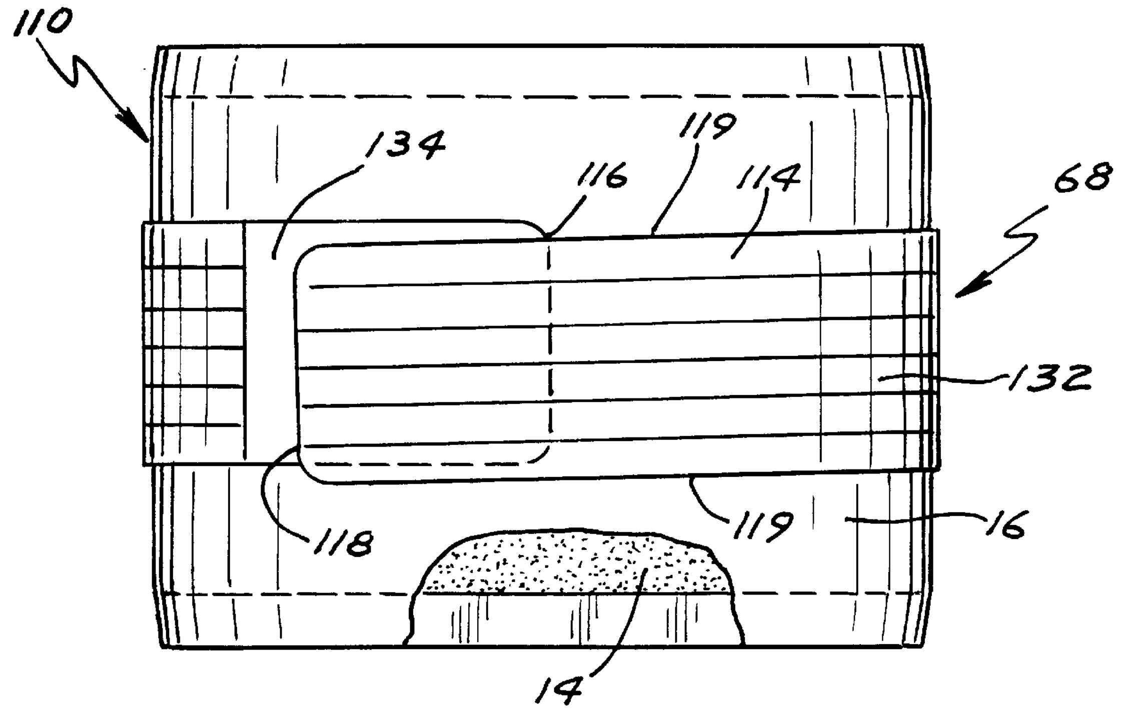
FIG. 1 shows a top plan view of a rolled food item including a label according to the preferred teachings of the present invention, with portions broken away to show the internal construction.
Figure 2:
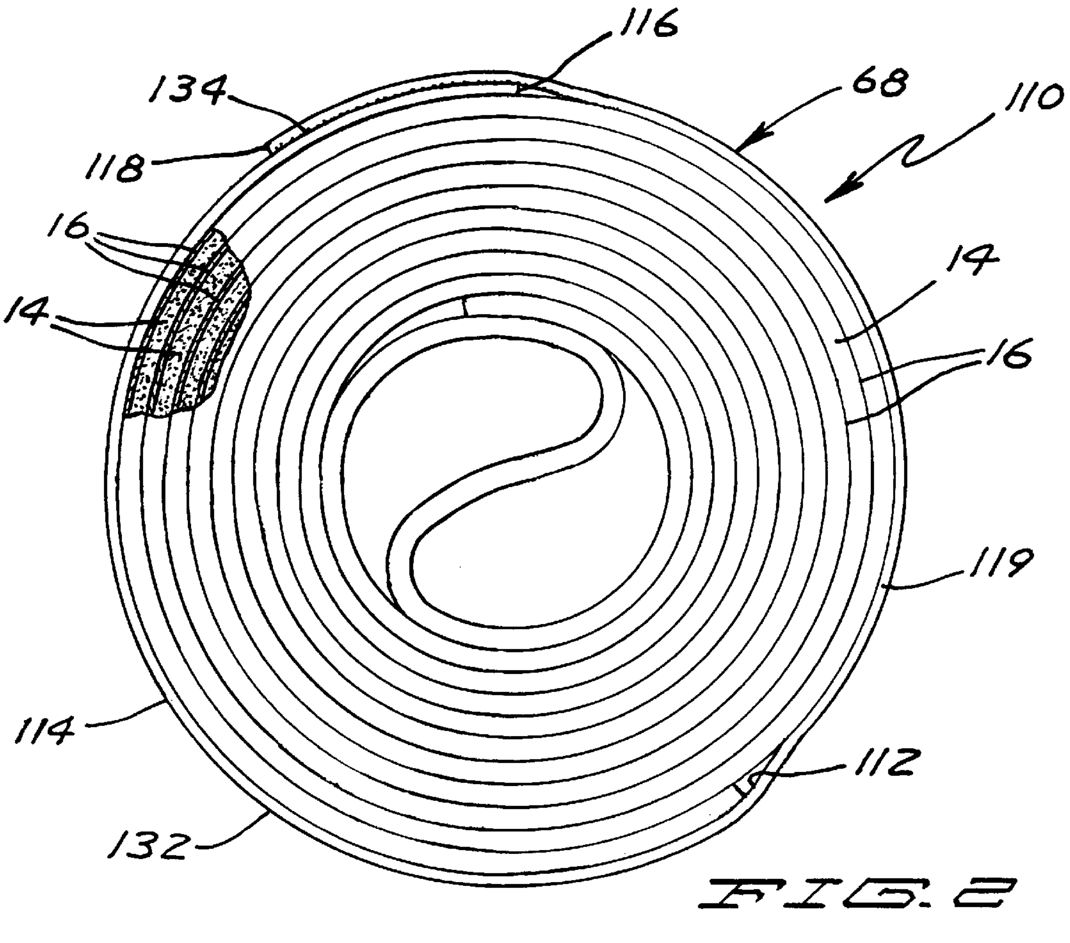
FIG. 2 shows a side elevational view of the rolled food item of FIG. 1.
Figure 3:
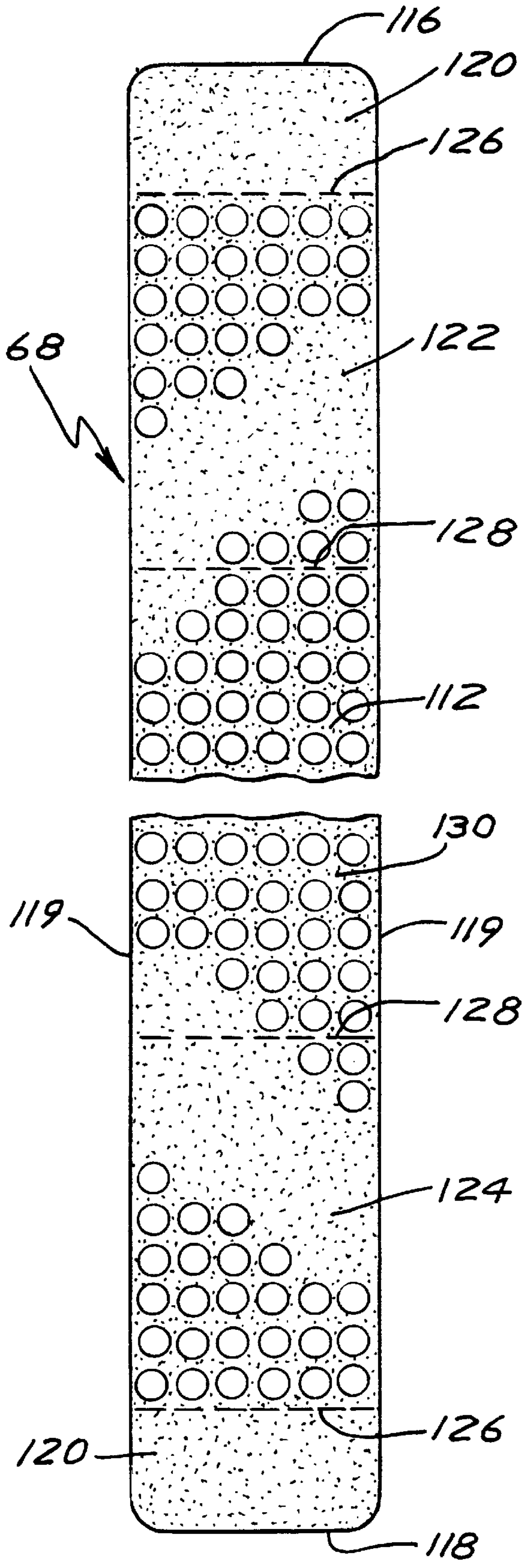
FIG. 3 shows a bottom plan view of the label of the rolled food item of FIG. 1.
Figure 4:
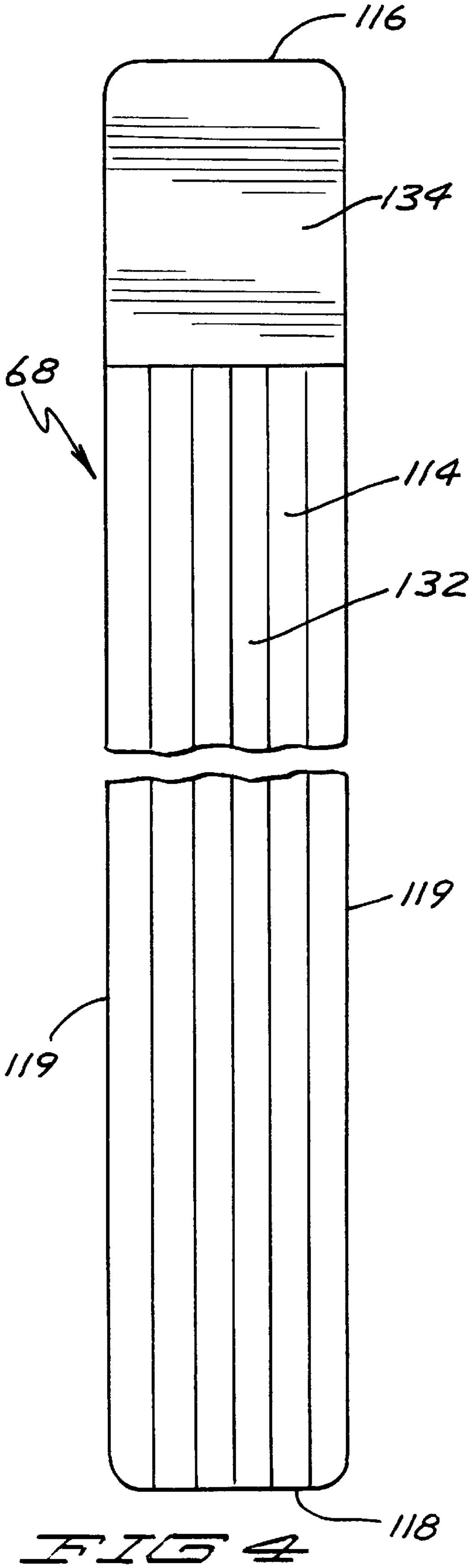
FIG. 4 shows a partial, top plan view of the label of the rolled food item of FIG. 1.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "first", "second", "lower", "upper", "end", "axial", "longitudinal", "width", "height", "inner", "outer", "leading", "trailing", and similar terms are used herein, it should be understood that these terms have reference only to the structure shown in the drawings as it would appear to a person viewing the drawings and are utilized only to facilitate describing the illustrative embodiment.

DESCRIPTION

A rolled food item according to the preferred teachings of the present invention is shown in the drawings and is generally designated 110. In the most preferred embodiment of the present invention, rolled food item 110 is an improvement of the type shown and described in U.S. Pat. Nos. 5,205,106; 5,284,667; 5,455,053 and 5,723,163. For purpose of explanation of the basic teachings of the present invention, the same numerals designate the same or similar parts in the present figures and the figures of U.S. Pat. Nos. 5,205,106; 5,284,667; 5,455,053 and 5,723,163. The description of the common numerals and rolled food item 110 may be found herein and in U.S. Pat. Nos. 5,205,106; 5,284,667; 5,455,053 and 5,723,163, which are hereby incorporated herein by reference.

Generally, rolled food item 110 includes strips of food 14 and support material 16 simultaneously rolled into a coil and held therein by a label 68 which extends beyond the trailing end or edge of the strip of food 14 and support material 16.

Food 14 is of a thinness requiring external support by support material 16. In the most preferred form, food 14 is a sweetened dehydrated fruit-based material typically referred to in the art as a fruit leather which can be derived from fruit purees and in the most preferred form is of the same type as utilized in the first, solid or "hard" portion or region of the dual textured food piece described in U.S. Pat. No. 4,847,098 issued Jul. 11, 1989 to J. E. Langler and in U.S. Pat. No. 4,853,236 issued Aug. 1, 1989 to J. E. Langler, each entitled Dual Textured Food Piece of Enhanced Stability and each of which is hereby incorporated herein by reference.

Support material 16 may be formed of any suitable material such as silicon parchment paper which has the necessary strength to support food 14 without tearing and without bulkiness to allow rolling of food 14 and support material 16 into a compact food piece and which allows food 14 to be easily separated therefrom for consumption.

In the preferred form, the strip of food 14 has side edges spaced inwardly from the side edges of the strip of support material 16 and in the most preferred form are spaced in the order of one sixteenth inch (1.6 mm) inwardly from the side edges of the strip of support material 16. Depending upon the method of fabrication, spacing the strip of food 14 inward of the side edges of the strip of support material 16 is advantageous as food 14 has less tendency to rub against the fabrication equipment which is undesirable as the side edges of the strip of food 14 could acquire an unsightly or otherwise undesirable appearance and as food 14 could build up or otherwise collect on the fabrication equipment requiring extra cleaning and maintenance. In the preferred form, the strip of food 14 does not extend beyond the leading and trailing edges or ends of the strip of support material 16 and in the most preferred form has a length equal to the length of the strip of support material 16 so that the leading and trailing ends of the strip of food 14 are coextensive with the leading and trailing ends of the strip of support material 16. Specifically, in the most preferred form, the strips of food 14 and support material 16 are formed continuously and are simultaneously cut to length such as by a water knife. In the preferred form, the width of the strip of support material 16 is minimal relative to its length and in the most preferred form, the strip of support material 16 has a width in the order of one and one-eighth inch (2.9 cm) and a length in the order of 36 inches (1 meter).

The strips of food 14 and support material 16 are rolled around their leading edges or ends into the coil having multiple rotations with the strip of support material 16 located on the outside of the roll or coil and with the trailing edge of the strips of food 14 and support material 16 located on the outside or periphery of the roll or coil. In the most preferred form, when the strips of food 14 and support material 16 are rolled, the periphery of the coil or roll is in the order of four and five-eighths inches (11.7 cm).

Label 68 in the most preferred form includes an adhesive or inner surface 112, an outer surface 114, a leading end or edge 116, a trailing end or edge 118, and side edges 119. In the preferred form, the length between edges 116 and 118 is greater than the periphery of the coil or roll of the strips of food 14 and support material 16 and in the most preferred form is about 5 inches (13 cm) long. However, in alternative embodiments, the length between edges 116 and 118 can be less than the periphery of the roll or coil. In the preferred form, the width between side edges 119 of label 68 is generally equal to or less than the width of the strip of support material 16 and in the most preferred form is generally equal to about 40% the width of the strip of support material 16. Surfaces 112 and 114 are generally rectangular in shape, with leading and trailing edges 116 and 118 being parallel to each other and perpendicular to side edges 119 which are parallel to each other.

Inner surface 112 of label 68 comes preapplied with a solid layer of adhesive 120. Adhesive 120 must be sufficiently aggressive to adhere to the strip of support material 16 without unintentional release. As support material 16 is a silicon parchment paper or similar silicon coated or backed substrate in the most preferred form and it is not easy to adhere anything thereto, adhesive 120 is generally the most aggressive that is available for possible direct contact with food 14.

According to the teachings of the present invention, first and second strips of masking 122 and 124 overlay zones of adhesive 120 at spaced locations from edges 116 and 118. Specifically in the preferred form, masking 122 and 124 each include outer edges 126 and inner edges 128 which in the preferred form are parallel to each other and to edges 116 and 118, with masking 122 and 124 extending between side edges 119. In the preferred form, edges 126 of masking 122 and 124 are spaced from edges 116 and 118, respectively, a relative short distance and in the most preferred form about ¼ inch (0.64 cm). The spacing between edges 126 and 128 of masking 122 and 124 is equal in the preferred form and is about three times the spacing of edges 126 from edges 116 and 118.

According to the teachings of the present invention, a third strip of masking 130 overlays a zone of adhesive 120 extending between edges 128 of masking 122 and 124 and between side edges 119. In the most preferred form, the length of masking 130 between edges 128 is a large multiple of the length of masking 122 and 124 between edges 126 and 128 and in the most preferred form is generally four times the length of masking 122 and 124 between edges 126 and 128.

Masking 122, 124 and 130 is applied over adhesive 120 to interfere with the adhesive properties of adhesive 120 such as by deadening adhesive 120. In the most preferred form, masking 122, 124, and 130 are each applied as a pattern of material to cover surface portions of adhesive 120, with the area covered by masking 122, 124 and 130 depending upon the level of deadening of the adhesive properties of adhesive 120 desired. In the most preferred form, masking 122, 124 and 130 is in the form of a varnish-like material which is applied in a pattern such as dots having circular peripheries, with the size and spacing of the dots from each other depending upon the level of deadening desired. In the most preferred form, the varnish-like material forming masking 122, 124 and 130 includes a dye or similar marking to allow fabrication personnel to identify labels 68 including masking 122, 124 and 130.

According to the preferred teachings of the present invention, the level of deadening of the adhesive properties of adhesive 120 provided in the zone by masking 122, 124 and 130 could range from 20% to 70%. In the most preferred form, the level of deadening of the adhesive properties of adhesive 120 provided by masking 122 and 124 is in the order of 60% while the level of deadening provided by masking 130 is in the order of 60% to 100% so that the adhesive properties in the zone covered by masking 130 is less than or equal to the adhesive properties in the zones covered by masking 122 and 124 and in the most preferred form is equal to the adhesive properties in the zones covered by masking 122 and 124. In the preferred form where deadening is accomplished by covering adhesive 120 with a pattern, adhesive 120 is completely covered when 100% deadening is desired. It can be appreciated that although a circular dot pattern has been shown, other patterns of masking 122, 124 and 130 can be utilized according to the preferred teachings of the present invention.

In the preferred form where the length of label 68 between edges 116 and 118 exceeds the perimeter of the coil of the strip of food 14 and support material 16, outer surface 114 of label 68 includes a first portion 132 of an overlaying glossy top coating extending from the trailing edge 118 towards but spaced from leading edge 116. Surface 114 further includes a second portion 134 free of the top coating of portion 132 and located proximate leading edge 116. Adhesive 120 is better able to adhere to surface 114 in portion 134 than in portion 132. As best seen in FIG. 1, portion 134 extends from leading edge 116 a distance generally equal to the overlap of trailing edge 118 past leading edge 116 of label 68 on rolled food item 110. Portion 132 would normally include graphics or other printing as desired for label 68.

Now that the basic construction of label 68 according to the preferred teachings of the present invention has been explained, a method of use and some of the advantages for labels 68 can be set forth and appreciated. Specifically, it is desirable to fabricate rolled food item 110 by prior fabrication methods on existing equipment such as shown and described in U.S. Pat. Nos. 5,205,106; 5,284,667; 5,455,053 and 5,723,163. Although it is desired that labels 68 adhere to support material 16 for efficient transport and wrapping of rolled food item 110, it is also desired that labels 68 be easily removed from surfaces to which labels 68 have been inadvertently or inappropriately affixed after their removal from rolled food item 110. In particular, labels 68 are manufactured by conventional manners by a label supplier with adhesive 120 covering the entire surface 112. Masking 122, 124 and 130 can be applied over adhesive 120 according to the desired level of deadening of the adhesive properties. Labels 68 including masking 122, 124 and 130 can then be applied to support material 16 such that leading edge 116 of label 68 is adhered to support material 16 and label 68 extends over the trailing edge of support material 16. It should then be appreciated that adhesive 120 in the first zone between edge 116 and masking 122 sticks to support material 16 with the normal aggressiveness. Trailing edge 118 can then be sandwiched against rolled food item 110. In the most preferred form where the length of label 68 between edges 116 and 118 is greater than the periphery of the coil of the strip of food 14 and support material 16, trailing edge 118 of label 68 will overlay outer surface 114 and in the most preferred form inside portion 134. Thus, adhesive 120 in the second zone between edge 118 and masking 124 will stick to outer surface 114 with the normal aggressiveness. Adhesive 120 in the zone which is not deadened by masking 122, 124 and 130 will also stick to support material 16 or outer surface 114 to assist adhesive 120 in the first and second zones between edges 116 and 118 and masking 122 and 124 in maintaining label 68 for securing the strip of food 14 and support material 16 in a coiled condition. It can be appreciated that in the most preferred form, securement of adhesive 120 in the second zone between edge 118 and masking 124 to outer surface 114 creates an annular shape for label 68 and securement of adhesive 120 in the first zone between edge 116 and masking 122 maintains the annular shaped label 68 in position relative to the coil of the strip of food 14 and support material 16. Also, adhesive 120 in the first zone between edge 116 and masking 122 is necessary to allow operation in fabrication equipment of the most preferred form. It can also be appreciated that if the length of label 68 between edges 116 and 118 is less than the periphery of the coil of the strip of food 14 and support material 16, adhesive 120 in the second zone between edges 118 and masking 124 will stick to support material 16.

Labels 68 can be applied to rolled food item 110 with adhesive 120 in the first zone between edge 116 and masking 122 applied to support material 16 before, during, or after rolling and in the most preferred form is applied before rolling.

It should then be appreciated that the deadening of adhesive 120 by masking 122, 124, and 130 is advantageous. Due to the greater adherence of label 68 adjacent edges 116 and 118, consumers will not have a tendency to peel label 68 from rolled food item 110 beginning with trailing edge 116 but will have a greater tendency to tear label 68 intermediate edges 116 and 118 into two pieces with one piece generally secured by adhesive 120 in the first zone between edge 116 and masking 122 to support material 16 and a second piece generally secured by adhesive 120 in the second zone between edge 118 and masking 124 to support material 16 or in the preferred form to the first piece. Thus, the pieces of label 68 remain adhered to support material 16 and are disposed therewith and are much less likely to be inadvertently affixed to surfaces of other objects than when label 68 or portions thereof are completely removed. Additionally, if label 68 or portions thereof have been inadvertently or inappropriately affixed to such surfaces, the portions of label 68 with masking 122, 124 and 130 can be relatively easily removed from most surfaces due to the deadening of the adhesive properties of adhesive 120. It can be appreciated that once a portion of label 68 has been removed from the surface, the remaining portion of label 68 adhered by adhesive 120 in the first and second zones not overlaid by masking 122, 124 and 130 can also be pulled from the surface due to their relatively small area. Thus, the problem resulting from the difficulty in removing prior labels has been overcome by labels 68 according to the teachings of the present invention.

Additionally, label 68 according to the teachings of the present invention including masking 122, 124 and 130 can be designed to provide additional play value when removed from rolled food item 110 and thereby increasing the promotional and marketability aspects of rolled food item 110. Specifically, removed labels 68 can be utilized in environments where temporary attachment is desired such as in a similar manner as where self-stick removeable notes such as those sold under the trademark POST-IT are utilized. Likewise, in cases where masking 130 deadens approximately 100% of the adhesive properties of adhesive 120, the removed labels 68 can be utilized in environments where attachment is not desired such as in the case where label 68 includes printing to function as a coupon for the future purchase of rolled food items 110 or to function as a prize or the like. It should be appreciated that labels 68 could include suitable graphics to tear labels 68 after their removal from rolled food item 110 to remove the zones of label 68 which does not include masking 122 and 124 and/or 130 to enhance its play value after its removal from rolled food item 110.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

I claim:

1. Rolled food item comprising, in combination: a strip of material rolled into a roll including a periphery having a length, with the strip of material located on the outside of the roll and including a trailing edge located on the periphery of the roll; and a label including an inner surface; an outer surface; a leading end; a trailing end; at least first and second side edges; first means adjacent the leading end for adhering the inner surface to the strip of material, with the inner surface extending over the trailing edge of the strip of material; second means adjacent the trailing end for adhering the inner surface to either the strip of material or the outer surface, with the first and second means each having adhesive properties which are equal; and third means located intermediate the first and second means for adhering the inner surface to either the strip of material or the outer surface but with lesser adhesive properties than the first and second means, with the third means extending over the trailing edge of the strip of material.

2. The label of claim 1 wherein the adhesive properties of the third means is in the range of 20 to 70% of the adhesive properties of the first and second means.

3. Label for a strip of food material rolled into a roll including a periphery having a length, with the strip of material located on the outside of the roll and including a trailing edge located on the periphery of the roll, comprising an inner surface; an outer surface; a leading end; a trailing end; at least first and second side edges; first means adjacent the leading end for adhering the inner surface to the strip of material, with the inner surface extending over the trailing edge of the strip of material; second means adjacent the trailing end for adhering the inner surface to either the strip of material or the outer surface, with the first and second means each having adhesive properties which are equal; and third means located intermediate the first and second means for adhering the inner surface to either the strip of material or the outer surface but with lesser adhesive properties than the first and second means; wherein the third means comprises fourth, fifth, and sixth means for adhering the inner surface to either the strip of material or the outer surface, with the fifth means located intermediate the fourth and sixth means, with the fifth means adhering the inner surface with lesser or equal adhesive properties than the fourth and sixth means.

4. The label of claim 3 wherein the adhesive properties of the fifth means is in the range of 60 to 100% less than the adhesive properties of the first and second means.

5. The label of claim 4 wherein the adhesive properties of the fourth and sixth means are equal and in the range of 20 to 70% less than the adhesive properties of the first and second means.

6. The label of claim 5 wherein the adhesive properties of the fourth and sixth means are in the order of 60% less than the adhesive properties of the first and second means.

7. The label of claim 3 wherein the first means extends from the leading end to the fourth means; and wherein second means extends from the trailing end to the sixth means.

8. The label of claim 7 further comprising, in combination: adhesive applied as a layer over the entire inner surface, with the adhesive having the adhesive properties of the first and second means, with the third means comprising masking applied over the adhesive and interfering with the adhesive properties of the adhesive, with the first and second means defined by the adhesive which has not been applied with masking.

9. The label of claim 8 wherein the masking comprises a pattern of material covering the adhesive.

10. The label of claim 9 wherein the pattern of material comprises dots having a size and spaced from each other.

11. The label of claim 8 wherein the adhesive is adapted for direct contact with food, with the strip of material supporting a strip of food.

12. The label of claim 11 wherein the strip of material and the strip of food thereon are rolled into the roll having multiple rotations.

13. The label of claim 12 wherein the strip of material and the strip of food thereon have a leading end, with the strip of material and the strip of food thereon being rolled around the leading end.

14. The label of claim 12 wherein the strip of material has a width greater than the width of the strip of food, with the strip of food having side edges spaced inwardly from the side edges of the strip of material.

15. The label of claim 11 wherein the strip of material comprises a strip of silicon coated or backed substrate.

16. The label of claim 7 wherein the fourth, fifth, and sixth means comprise zones extending between the side walls.

17. The label of claim 16 wherein the inner surface is generally rectangular shaped, with the zones being generally parallel to the trailing and leading ends.

18. The label of claim 1 wherein a length is defined between the leading and trailing ends which is greater than the length of the periphery, with the second means adhered to the outer surface.

19. The label of claim 18 wherein the outer surface includes a first portion extending from the trailing end towards but spaced from the leading end and including a glossy top coating; and wherein the outer surface further includes a second portion adjacent the leading end which is free of the glossy top coating, with the second means adhered to the second portion of the outer surface.

* * * * *